United States Patent
Wetegrove et al.

(10) Patent No.: US 11,209,274 B2
(45) Date of Patent: Dec. 28, 2021

(54) METHOD TO DETERMINE A STOPPING DISTANCE OF AN INDUSTRIAL TRUCK

(71) Applicant: Jungheinrich Aktiengesellschaft, Hamburg (DE)

(72) Inventors: Ralf Wetegrove, Norderstedt (DE); Hannes Bistry, Pinneberg (DE); Florian Grabbe, Hamburg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 88 days.

(21) Appl. No.: 16/360,594

(22) Filed: Mar. 21, 2019

(65) Prior Publication Data

US 2019/0293430 A1 Sep. 26, 2019

(30) Foreign Application Priority Data

Mar. 22, 2018 (DE) .................... 10 2018 106 892.1

(51) Int. Cl.

| G01C 21/16 | (2006.01) |
|---|---|
| G05D 1/02 | (2020.01) |
| B66F 9/24 | (2006.01) |
| B66F 17/00 | (2006.01) |
| B60T 8/172 | (2006.01) |
| B66F 9/075 | (2006.01) |

(52) U.S. Cl.
CPC .............. *G01C 21/16* (2013.01); *B60T 8/172* (2013.01); *B66F 9/0755* (2013.01); *B66F 9/24* (2013.01); *B66F 17/003* (2013.01); *G05D 1/0225* (2013.01); *G05D 2201/0216* (2013.01)

(58) Field of Classification Search
CPC . G01C 21/16; B60T 8/172; B60T 8/58; B66F 9/24; B66F 17/003; B66F 9/10; G05D 1/0225; G05D 2201/0216; G05D 1/02; B60W 40/105; B60W 40/107; B60W 30/181
See application file for complete search history.

(56) References Cited

U.S. PATENT DOCUMENTS 4,964,679 A * 10/1990 Rath ...................... B60K 31/02
180/171

FOREIGN PATENT DOCUMENTS

| DE | 1530262 | | 2/1943 | | |
|---|---|---|---|---|---|
| DE | 2624041 | A1 | 12/1977 | | |
| DE | 4210992 | A1 | 10/1993 | | |
| DE | 4228413 | | * 4/1994 | ............ | G01M 17/00 |
| DE | 19728867 | | * 1/1999 | ............ | G01G 19/08 |

(Continued)

OTHER PUBLICATIONS

Machine Translation of JP2004161472A, Inventor: Chin Shiyomei.*

(Continued)

*Primary Examiner* — Peter D Nolan
*Assistant Examiner* — Kenneth M Dunne
(74) *Attorney, Agent, or Firm* — Barclay Damon LLP

(57) ABSTRACT

A method to determine a stopping distance of an industrial truck comprises the steps of (i) measuring a distance traveled by the industrial truck and set points in time therebetween to determine a current vehicle speed, (ii) ascertaining at least one comparative value indicative of a relative speed change depending on at least one distance traveled during an acceleration of the industrial truck, and (iii) determining the stopping distance from the current vehicle speed and the ascertained comparative value.

3 Claims, 1 Drawing Sheet

(56) References Cited

FOREIGN PATENT DOCUMENTS

| | | | |
|---|---|---|---|
| DE | 102004044788 A1 | 4/2006 | |
| DE | 102006016765 A1 | 10/2007 | |
| EP | 1298020 * | 4/2003 | ............... B60T 8/00 |
| FR | 2815314 * | 4/2002 | ............. B60T 8/172 |
| JP | H0196705 A | 4/1989 | |
| JP | H06258335 A | 9/1994 | |
| JP | 2003259503 A | 9/2003 | |
| JP | 2004161472 A | 6/2004 | |

OTHER PUBLICATIONS

Machine Translation of JP01096705A, Inventor: Kono Ichiro.*
Machine Translation of EP38956A2, Inventors: Gerum et al.*
Wikipedia Page, "Braking Distance", 2015, Wikipedia page found using waybackmachine (Year: 2015).*
EP 19161330; filed Mar. 7, 2019; European Search Report; dated Aug. 28, 2019; 9 pages.

* cited by examiner

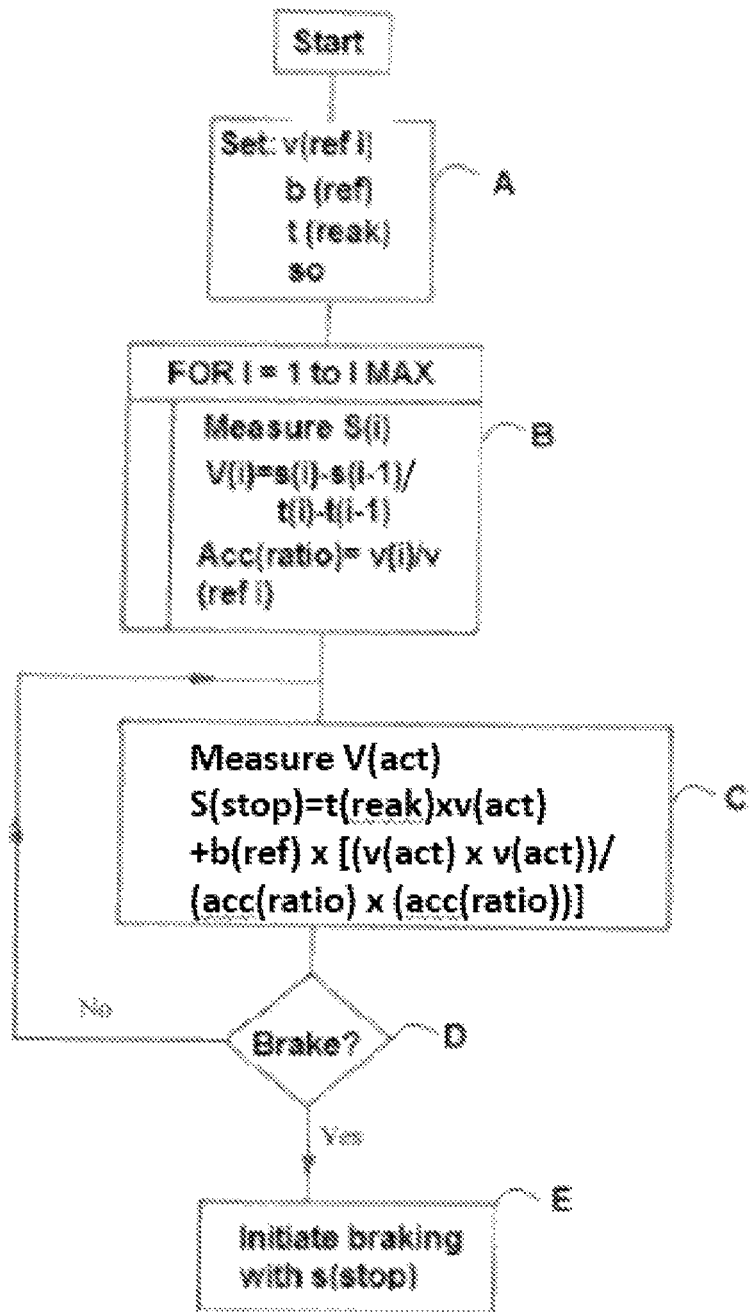

METHOD TO DETERMINE A STOPPING DISTANCE OF AN INDUSTRIAL TRUCK

CROSS REFERENCE TO RELATED DISCLOSURE

This application is based upon and claims priority to, under relevant sections of 35 U.S.C. § 119, German Patent Application No. 10 2018 106 892.1, filed Mar. 22, 2018, the entire contents of which are hereby incorporated by reference.

TECHNICAL FIELD

The present disclosure relates to a method for determining a stopping distance of an industrial truck and, more particularly, to a method to precisely determine the stopping distance of vehicles that are automated order pickers.

BACKGROUND

The ability to determine the correct stopping distance of an industrial truck can influence its ability to precisely approach the next picking place, i.e., the place at which the next load should be received or removed. The stopping distance of industrial trucks can vary strongly and, more so, with partially automated order pickers. Specifically, the stopping distance of industrial trucks which incorporate partially automated commands for picking orders depends on a variety of circumstances and variables such as the load status, driving speed and tire grip.

A method for determining the mass of rail vehicles when braking is disclosed in DT 15 30 262. A significant difference in the braking distance is disclosed in connection with passenger trains, freight trains and other heavily laden vehicles given the influence due to the friction coefficient between the wheel and the rail. Therein, it is disclosed to measure the path, speed, and the time associated with a uniform acceleration, for the purpose of determining the mass of the train therefrom. With the assistance of the mass determined thereby, a value can be calculated for the braking force or more specifically for the braking point. A disadvantage of the known method is that in contrast to a freight train, the ratio of empty load to payload is different with an industrial truck, so that determining the payload is associated with significant imprecision due to the high empty load.

SUMMARY OF THE DISCLOSURE

A method is provided for determining a stopping distance of an industrial truck including the step of measuring a distance traveled by the industrial truck at different set points in time. Alternatively it is also possible to measure certain distances. This means that the distance traveled (s(t)) is measured once a predetermined distance (s_i) has been already been traveled. In so doing, the set points in times can, for example, be at an even or the same interval of time as the predetermined distances become larger or greater with increasing speed. Another method step includes ascertaining a comparative value indicative of a relative change in speed of the industrial truck. The comparative value is ascertained based on the distance measured during a uniform acceleration of the industrial truck. The stopping distance is, therefore, determined by evaluating the current driving speed and the ascertained comparative value. More specifically, the comparative value takes into account not only the total mass of the industrial truck, but, rather the current acceleration behavior of the industrial truck as the comparative value integrates the relative change in speed or the rate of change of velocity. The disclosure is based on an insight that the acceleration during start-up, or the rate of change of velocity, can be evaluated to determine the stopping distance of the industrial truck. This can be established with great precision when using the current driving environment of the vehicle.

In one embodiment of the method, at least one comparative value is evaluated by obtaining an average speed for an interval of time between the prior two set points from a traveled distance between the last set points in time. A comparative speed is obtained for an interval of time between the prior two set points in time. A comparative speed can be obtained based on empirical data, or can originate from simulations/calculations. The comparative values (i.e., indicative of a change in speed) are determined based on a quotient of the ascertained average speed and the empirically-derived, simulation-generated, or calculation-based comparative speed values. Ascertainment of the at least one comparative value is derived from the concept that the actually achieved average speed for a corresponding interval in time relative to a comparative speed (considered to be a reference for a defined industrial truck in a defined environment) is an indicator of whether the vehicle gathers pace more quickly or more slowly. The quotient is dimensionless and yields a value of 1.0 under reference or ideal conditions. If the vehicle gathers pace more slowly during an acceleration, its average speed is less than the comparative speed, hence the quotient of the comparative value is less than 1.0. If the vehicle is, for example, lighter or has better tire grip, the average speed in the trial time of the two set points is greater than the comparative speed. In this case, the quotient assumes a value greater than 1.0. Furthermore, the average speeds can also be compared for paths.

With the method of the disclosure, it is advantageous to repetitively determine comparative values associated with acceleration, such that the comparative values may be re-evaluated at different time intervals between two points in time, or for multiple path sections. Since the distance traveled increases by a factor of two (2) over time, the increase enables a more precise evaluation. In a preferred embodiment, it is also useful to consider reaction time for determining or calculating the stopping distance. The reaction time can be empirically determined or estimated. The path can, for example, be estimated as the product of the reaction time and the current actual speed. In this case, the reaction time is, for example, an empirically determined value that takes into consideration the particular situation of use of the industrial truck and a delayed reaction due to a complex environmental situation.

Moreover, it has been determined to be advantageous to provide a reference stopping distance, and to weigh the reference stopping distance against the actual speed and the comparative value to determine the current stopping distance. It is particularly advantageous in this step, that the actual speed of the vehicle be incorporated directly when determining the stopping distance. Other values are not incorporated directly with the comparative value, but rather incorporated indirectly with each other. Preferably a quotient of the actual speed and reference value of the vehicle is chosen, and multiplied by the reference stopping distance. It is also advantageous to multiply a power consisting of the quotient of the actual speed and reference value with the reference stopping distance. Preferably, the square, or a power on the order of 2, is chosen as the power.

BRIEF DESCRIPTION OF THE DRAWINGS

The method according to the disclosure will be further described with reference to the accompanying FIGURES wherein:

FIG. 1 is a flowchart of the method according to the present disclosure.

DETAILED DESCRIPTION OF THE DISCLOSURE

The method according to the disclosure provides a series of reference values and constants. The reference values can, for example, be generated from measurements of the vehicle starting with a zero payload or using an empty vehicle. The reference values can also be used for different road surfaces, tires, wheel sizes etc., A reference stopping distance b(ref) that defines an average stopping distance of an unloaded vehicle in a reference environment can be used as one of these constants and/or values.

The stopping distance is detected and saved as a unit of length in centimeters or meters while the reaction time t(reac), is measured in seconds. Reaction time is not the purely physiological reaction time that, for example, results for a motor vehicle driver, but may differ from this. Given the work environment in an industrial truck with the plurality of environmental impressions and certain psychological aspects of stress, the necessary reaction time for the stopping distance of an industrial truck may deviate. Furthermore, a set of reference speeds is given. The reference speeds each refer to a time interval "i" which lies between points in time t(i-1) and t(i.) For example, a series of different time intervals can be given. Alternatively, it is also possible to specify the reference speed for the intervals depending on the stretch. For this, the path interval lying between the two last set distances is accessed. In this case, a reference speed for the stretch of 10 cm to 30 cm, 30 cm to 50 cm, 50 cm to 70 cm and 70 cm to 100 cm is given, for example.

During the travel of the industrial truck, a measuring apparatus or computer processing device is continuously running that measures a distance traveled. The traveled distance can for example be measured by an incremental encoder disposed on a wheel of the industrial truck; or by other measurement means.

In the method according to the disclosure, a stretch s(i) is continuously measured at points in time t(i.) For the measured stretch s(i), the average speed for the time interval t(i−1)(to t(i) is calculated relative to the last measured stretch s(i−1). The average speed is calculated as the quotient of the traveled path by the time interval. By adding the reference speed, the comparative value acc(ratio) is ascertained from the measured average speed. The comparative value makes it possible to render a statement regarding how fast or slow the average speed in the i-th time interval is in comparison to a reference speed for the i-th time interval. The comparison of the time intervals makes it clear that a comparison can only be made from the same starting conditions.

The comparative value acc(ratio) determined in this manner indicates as a factor whether the average speed in the i-th interval is greater than, equal to or less than the reference speed for the i-th time interval.

The above-described observation of the interval is repeated for the intervals corresponding to the given intervals, or respectively the given reference speeds. In this context, it is possible to recalculate the comparative value acc(ratio) for each interval as shown in the flow chart. It is, alternately also possible, to continuously update the comparative value and, for example, make it depend on the comparative values determined in the proceeding intervals. A weighted average can also be used in this case.

Upon conclusion of the starting and/or acceleration process, in FIG. 1, a comparative value acc(ratio) (Steps A and B) is determined that is suitable for the subsequent procedure. The comparative value may be re-checked during each start and/or acceleration since the load on the vehicle may have changed between each starting process or between processes due to loading and unloading processes. In addition, other factors influencing the driving behavior may have changed between two starting processes, such as the temperature of the tires (hence the tire grip) the nature of the ground and other variables influencing the stopping distance.

In Step C, the process for determining the stopping distance includes measuring the current actual speed V(act) is measured. The actual speed can, for example, be determined by measuring the traveled distance. For this, the traveled distances at two points in time with a set time interval therebetween are measured, and the current speed is determined therefrom. The resulting stopping distance s(stop) consists of two added terms. The first term relates to the distance traveled until there is a reaction of the vehicle. With a semi-automatically, or fully automatically traveling vehicle, the reaction time is necessary due to the processing times to recognize the stopping position/stopping command, and to head toward the stopping place. With manually actuated vehicles, the reaction time also includes to the time necessary for the driver to react. The second term for the reaction time results from the reference stopping distance b(ref.) The reference stopping distance is a stopping distance that also corresponds to the comparative speeds v(ref.) If the comparative speeds are maintained during the starting and/or acceleration, the comparative value is always 1.0, and the reference stopping distance b(ref) only depends on the current vehicle speed. The reference stopping distance b(ref) corresponds to a reciprocal of the acceleration, i.e. $s^2/m-1$.

The overall existing stopping distance s(stop) is composed of two terms including the reaction time and the reference stopping distance. The reference stopping distance is multiplied by the square of the actual speed divided by the square of the comparative value. The quadratic dependence on the actual speed corresponds, in this case, to the fact that the stretch is quadratically dependent on the passed time given a constant braking force or acceleration.

In Step D, the question regarding whether to brake can be introduced for a variety of reasons. One possible reason for initiating a braking process exists when a target distance s(target) is specified. Then the braking process is initiated when the distance traveled s(i) and the stopping distance s(stop) are equal or greater than the set target distance s(target) as seen in Step E.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for determining a stopping distance of an industrial truck, comprising the steps of:
   configuring an industrial truck with a measuring apparatus and a braking system suitable for stopping the industrial truck within a predetermined stopping distance;
   measuring a distance traveled by the industrial truck over an elapsed time by the measuring apparatus;
   calculating an actual speed of the industrial truck from the distance travelled over elapsed time;
   calculating a comparative speed value during multiple acceleration events of the industrial truck by calculating a rate of change of the actual speed of the industrial truck over the elapsed time; and
   repeatedly calculating the comparative speed value with each of the acceleration events;
   determining an instantaneous stopping distance of the industrial truck based on: (i) the actual speed of the vehicle and (ii) the comparative speed value by weighing a quotient of the actual speed divided by the comparative speed value, where the quotient is raised to a power greater than one, wherein the comparative speed value is a speed value between one of (i) two points in time or (ii) the time elapsed between a first and second travelled distance;
   and
   controlling the braking system of the industrial truck to stop the industrial truck in accordance with the actual speed and the comparative speed value.

2. The method according to claim 1 wherein the step of determining the stopping distance of the industrial truck includes the step of:
   adding a distance resulting from a reaction time and the actual speed.

3. A method for determining a stopping distance of an industrial truck, comprising the steps of:
   configuring an industrial truck with a measuring apparatus and a braking system suitable for stopping the industrial truck within a predetermined stopping distance;
   measuring a distance traveled by the industrial truck over an elapsed time by the measuring apparatus;
   calculating a comparative speed value during multiple acceleration events of the industrial truck repeatedly calculating the comparative speed value based on at least two acceleration events of the industrial truck by:
      determining a first comparative speed value during a first acceleration event of the industrial truck
      modifying the first comparative speed value by a second comparative speed value during a second acceleration event of the industrial truck, the second comparative speed value being determined by calculating a comparative speed of the industrial truck between one of (i) two points in time, and (ii) the time elapsed between a first and a second traveled distance, and,
   determining the stopping distance of the industrial truck based on: (i) the actual speed of the industrial truck, (ii) the comparative speed value by weighing a quotient of the actual speed divided by the comparative speed value, where the quotient is raised to a power greater than one; and (iii) adding a distance resulting from a reaction time,
   and
   controlling the braking system of the industrial truck to stop the industrial truck in accordance with the actual speed, comparative value and reaction time.

* * * * *